US009697198B2

(12) United States Patent
Davis Jones et al.

(10) Patent No.: US 9,697,198 B2
(45) Date of Patent: Jul. 4, 2017

(54) GUIDING A CONVERSATION BASED ON COGNITIVE ANALYTICS

(71) Applicant: International Business Machines Corporation, Armonk, NY (US)

(72) Inventors: Dale K. Davis Jones, Ocala, FL (US); Amol A. Dhondse, Pune (IN); Bruce A. Jones, Highland, NY (US); Anand Pikle, Bibwewadi (IN); Gandhi Sivakumar, Victoria (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/875,660

(22) Filed: Oct. 5, 2015

(65) Prior Publication Data
US 2017/0097928 A1   Apr. 6, 2017

(51) Int. Cl.
G06F 17/27 (2006.01)
G06F 17/21 (2006.01)
(Continued)

(52) U.S. Cl.
CPC .......... *G06F 17/279* (2013.01); *H04L 67/306* (2013.01); *G06Q 50/01* (2013.01)

(58) Field of Classification Search
CPC .. G06F 17/28; G06F 17/2785; G06F 17/2775; G06F 17/2705; G06F 17/2755;
(Continued)

(56) References Cited

U.S. PATENT DOCUMENTS 5,895,466 A     4/1999  Goldberg et al.
6,546,405 B2 *  4/2003  Gupta ................... G06F 17/241
                                                    345/691
(Continued)

FOREIGN PATENT DOCUMENTS

CN     101010934 B    9/2010
WO     02073331 A2    9/2002
WO     02084561 A1    10/2002

OTHER PUBLICATIONS

Khan, Faisal M., et al. "Mining chat-room conversations for social and semantic interactions." Computer Science and Engineering, Lehigh University (2002).*
(Continued)

*Primary Examiner* — Edgar Guerra-Erazo
(74) *Attorney, Agent, or Firm* — Garg Law Firm, PLLC; Rakesh Garg; Christopher K. McLane

(57) ABSTRACT

To guide a conversation based on cognitive analytics, data of the conversation up to a time in the conversation is received from a conversation interface while the conversation is continuing. Current data is received from a data source. The current data relates to a remote participant in the conversation and a topic in the conversation. A sentiment value of the remote participant during the conversation is determined from the current data and the conversation data. While the conversation is continuing, data of a prompt is introduced into the conversation. The data of the prompt is configured to cause the conversation to increase the sentiment value of the remote participant. A profile of the remote participant is updated with the sentiment value, to form an updated profile. The updated profile is used as a second data source in a later portion of the conversation.

20 Claims, 5 Drawing Sheets

(51) Int. Cl.
*H04L 29/08* (2006.01)
*G06Q 50/00* (2012.01)

(58) Field of Classification Search
CPC .............. G06F 17/21; G06F 17/30598; G06F 17/30663; G06F 17/30731; G06F 11/30; G06F 17/30424; G06F 17/3043; G06F 17/30699; G06F 17/30914; G06F 17/30976
USPC ..................................................... 704/1–10
See application file for complete search history.

(56) References Cited

U.S. PATENT DOCUMENTS

| | | | |
|---|---|---|---|
| 6,892,192 B1 | 5/2005 | Geddes et al. | |
| 6,925,436 B1* | 8/2005 | Franz | G10L 15/26 704/235 |
| 7,269,252 B2* | 9/2007 | Eran | H04M 3/18 379/158 |
| 7,330,845 B2 | 2/2008 | Lee et al. | |
| 7,689,524 B2 | 3/2010 | Ozzie et al. | |
| 7,702,508 B2 | 4/2010 | Bennett | |
| 8,126,705 B2* | 2/2012 | Aoki | H04M 3/564 370/260 |
| 8,180,044 B1* | 5/2012 | McCormack | H04M 3/5233 379/265.05 |
| 8,204,751 B1 | 6/2012 | DiFabbrizio et al. | |
| 8,429,103 B1 | 4/2013 | Aradhye et al. | |
| 8,484,080 B2 | 7/2013 | Sneyders | |
| 8,495,663 B2 | 7/2013 | Tien et al. | |
| 8,583,680 B2 | 11/2013 | Hoang | |
| 8,639,650 B1 | 1/2014 | Gill | |
| 2002/0099552 A1* | 7/2002 | Rubin | G09F 27/00 704/270 |
| 2002/0188681 A1* | 12/2002 | Gruen | G06Q 10/107 709/204 |
| 2003/0055711 A1* | 3/2003 | Doherty | G06Q 30/02 705/7.33 |
| 2004/0098754 A1* | 5/2004 | Vella | H04N 5/445 725/135 |
| 2005/0027664 A1 | 2/2005 | Johnson et al. | |
| 2005/0105712 A1 | 5/2005 | Williams et al. | |
| 2005/0234958 A1* | 10/2005 | Sipusic | G06F 3/0485 |
| 2005/0256905 A1* | 11/2005 | Gruhl | G06F 17/30705 |
| 2005/0257148 A1 | 11/2005 | Goodman et al. | |
| 2005/0262542 A1* | 11/2005 | DeWeese | H04L 12/1818 725/106 |
| 2007/0117508 A1* | 5/2007 | Jachner | H04M 3/56 455/3.06 |
| 2008/0010347 A1* | 1/2008 | Houghton | H04L 29/06027 709/205 |
| 2008/0044048 A1* | 2/2008 | Pentland | H04S 1/007 381/315 |
| 2008/0154908 A1* | 6/2008 | Datar | G06F 17/30817 |
| 2008/0208820 A1* | 8/2008 | Usey | G06F 17/30616 |
| 2008/0300872 A1* | 12/2008 | Basu | G06F 17/30017 704/235 |
| 2008/0306899 A1* | 12/2008 | Gregory | G06F 17/30719 |
| 2009/0240488 A1* | 9/2009 | White | G06F 3/0236 704/9 |
| 2009/0282114 A1* | 11/2009 | Feng | G06Q 10/107 709/206 |
| 2010/0020955 A1* | 1/2010 | Wengrovitz | H04M 3/568 379/202.01 |
| 2010/0145700 A1 | 6/2010 | Kennewick et al. | |
| 2010/0202670 A1* | 8/2010 | Tian | G06K 9/6296 382/118 |
| 2010/0251177 A1* | 9/2010 | Geppert | G06F 3/04817 715/821 |
| 2011/0035445 A1* | 2/2011 | Eickhoff | G06Q 10/10 709/204 |
| 2011/0064318 A1* | 3/2011 | Gao | G06F 17/30781 382/224 |
| 2011/0126258 A1* | 5/2011 | Emerson | H04L 12/581 725/133 |
| 2011/0191417 A1 | 8/2011 | Rathod | |
| 2011/0271213 A1* | 11/2011 | Newman | H04L 12/1822 715/758 |
| 2012/0011158 A1* | 1/2012 | Avner | G06F 17/2785 707/777 |
| 2012/0046936 A1* | 2/2012 | Kandekar | G06Q 30/0282 704/9 |
| 2012/0089683 A1 | 4/2012 | Griesmer et al. | |
| 2012/0185544 A1 | 7/2012 | Chang et al. | |
| 2012/0246191 A1* | 9/2012 | Xiong | G06Q 50/01 707/769 |
| 2012/0265808 A1* | 10/2012 | Ezell | H04L 12/1822 709/204 |
| 2012/0271697 A1 | 10/2012 | Gilman et al. | |
| 2012/0306993 A1* | 12/2012 | Sellers-Blais | H04L 65/1009 348/14.08 |
| 2012/0308206 A1* | 12/2012 | Kulas | H04N 7/173 386/244 |
| 2013/0073336 A1 | 3/2013 | Heath | |
| 2013/0073473 A1 | 3/2013 | Heath | |
| 2013/0170637 A1 | 7/2013 | Klemm et al. | |
| 2013/0176413 A1* | 7/2013 | Lowry | H04M 3/5175 348/77 |
| 2013/0253929 A1 | 9/2013 | Weider et al. | |
| 2014/0095145 A1 | 4/2014 | Assulin et al. | |
| 2014/0122412 A1 | 5/2014 | Bandekar et al. | |
| 2015/0100943 A1* | 4/2015 | Gabel | G06Q 30/02 717/106 |

OTHER PUBLICATIONS

Resenberg et al; Guidelines for Usage of the Session Initiation Protocol (SIP) Caller Preferences Extension, Jul. 1, 2006.
Mahy et al; A Call Control and Multi-Party Usage Framework for the Session Initiation Protocol (SIP), May 1, 2010.
Earley et al; Presentation 1: Information governance in the age of big data, May 22, 2014.
24/7 Customer, Inc., [24]7 Makes IVR Integral to Digital Customer Engagement, Campbell, Calif.—Aug. 18, 2014, http://www.247inc.com/company/pressreleases/247makesivrintegraldigitalcustomerengagement.
Jackson, IBM bets big on Watson-branded cognitive computing, http://news.idg.no/cw/art.cfm?id=BB0161AB-AEDD-54D5-ACF882FB701DB5FE, Sep. 1, 2014, IDG News Service, New York Bureau.
Kile; SpeechTechMag.com: IBM's Watson Brings Cognitive Computing to Customer Engagement, Feb. 10, 2014.
IPsoft; Big Data Analytics, http://www.ipsoft.com/what-we-do/big-data-analytics/, 2015.
IPsoft; Amelia, The First Cognitive Agent Who Understands Like a Human, http://www.ipsoft.com/what-we-do/amelia/, 2015.

* cited by examiner

GUIDING A CONVERSATION BASED ON COGNITIVE ANALYTICS

TECHNICAL FIELD

The present invention relates generally to a method, system, and computer program product for improving the productivity of real-time conversations. More particularly, the present invention relates to a method, system, and computer program product for guiding a conversation based on cognitive analytics.

BACKGROUND

Analytics is the science of data analysis. Cognitive analytics is the process of analyzing available information or knowledge to create, infer, deduce, or derive new information.

Natural language processing (NLP) is a technique that facilitates exchange of information between humans and data processing systems. For example, one branch of NLP pertains to transforming human readable content into machine usable data. For example, NLP engines are presently usable to accept input content such as a newspaper article or a whitepaper, and produce structured data, such as an outline of the input content, most significant and least significant parts, a subject, a reference, dependencies within the content, and the like, from the given content.

Information about a domain can take many forms, including but not limited to knowledge repositories and ontologies. For example, domain-specific information can take the form of a list of words, phrases, and their equivalents as relate to a product.

Such information can be sourced from any number of data sources. The presenter of the information generally selects the form and content of the information. Before information can be used for NLP, generally, the information has to be transformed into a form that is usable by an NLP engine.

Another branch of NLP pertains to answering questions about a subject matter based on information available about the subject matter domain. This is the branch of cognitive analytics, and is also referred to as a Question and Answer system (Q and A system).

A Q and A system is an artificial intelligence application executing on data processing hardware. A Q and A system answers questions pertaining to a given subject-matter domain presented in natural language.

Typically, a Q and A system is provided access to a collection of domain specific information based on which the Q and A system answers questions pertaining to that domain. For example, a Q and A system accesses a body of knowledge about the domain, where the body of knowledge (knowledgebase) can be organized in a variety of configurations. For example, a knowledgebase of a domain can include structured repository of domain-specific information, such as ontologies, or unstructured data related to the domain, or a collection of natural language documents about the domain.

SUMMARY

The illustrative embodiments provide a method, system, and computer program product for guiding a conversation based on cognitive analytics. An embodiment includes a method for guiding a conversation based on cognitive analytics. The embodiment receives, from a conversation interface, while the conversation is continuing, data of the conversation up to a time in the conversation. The embodiment receives while the conversation is continuing, current data from a data source, the current data relating to a remote participant in the conversation and a topic in the conversation. The embodiment determines, from the current data and the conversation data, a sentiment value of the remote participant during the conversation. The embodiment introduces, while the conversation is continuing, data of a prompt into the conversation, wherein the data of the prompt is configured to cause the conversation to increase the sentiment value of the remote participant. The embodiment updates a profile of the remote participant with the sentiment value, to form an updated profile. The embodiment uses the updated profile as a second data source in a later portion of the conversation.

Another embodiment includes a computer program product for guiding a conversation based on cognitive analytics, the computer program product comprising one or more computer-readable storage devices, and program instructions stored on at least one of the one or more storage devices.

Another embodiment includes a computer system for guiding a conversation based on cognitive analytics, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
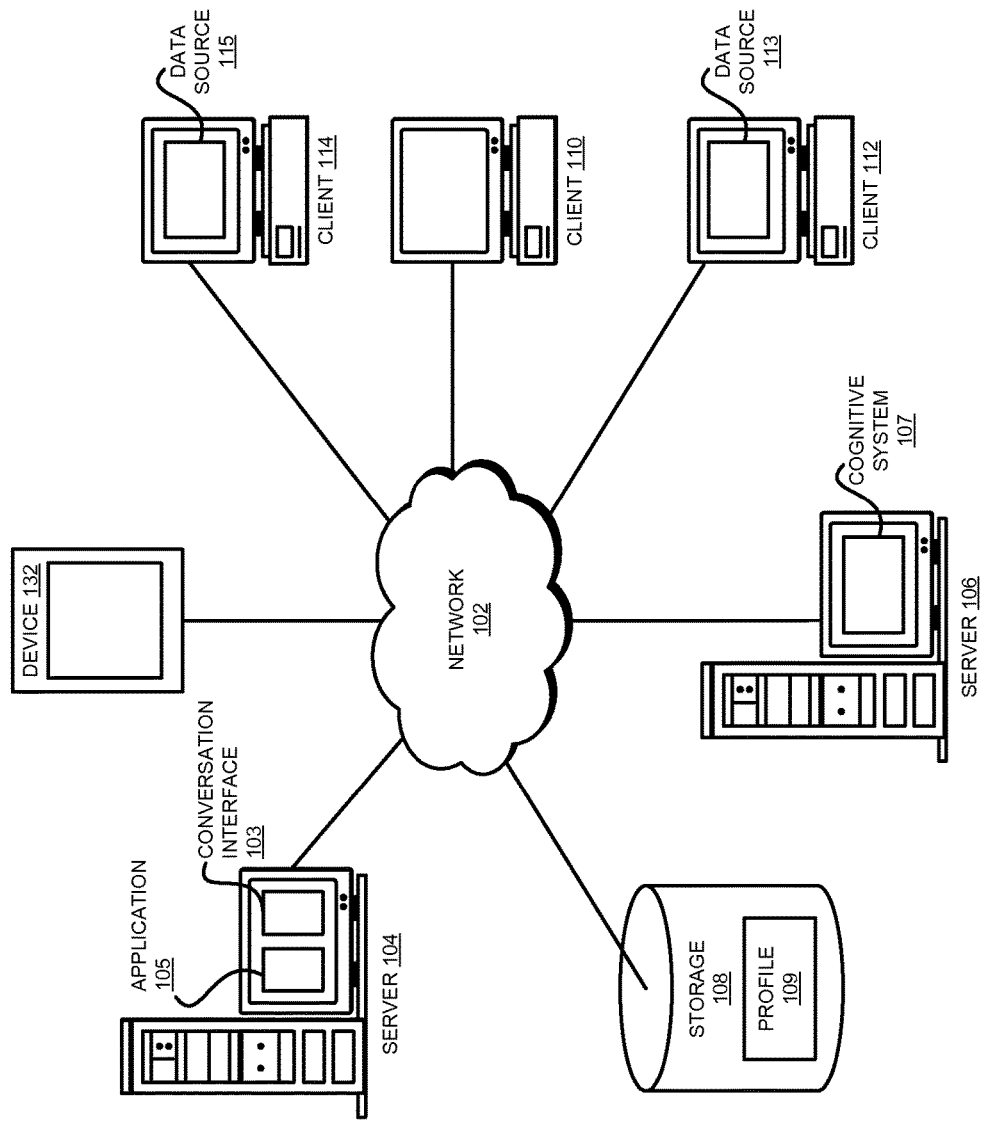
FIG. 1 depicts a block diagram of a network of data processing systems in which illustrative embodiments may be implemented.

Within the scope of the illustrative embodiments, a conversation is any interaction that occurs in real-time between two or more parties. Some examples of a conversation include but are not limited to an audio telephonic conversation between two or more persons, a text and/or image based chat or messaging between persons or a person and a system, and a video-only or audio-video communication between persons or a person and a system. Telecommunication delays and other latencies in the systems are contemplated in real-time conversations within the scope of the illustrative embodiments.

Various embodiments are described with respect to a conversation that takes the form of a text-based interactive messaging only as a non-limiting example for clarity. An embodiment can be adapted for use with any form of conversation conceivable from this disclosure and such adaptations are contemplated within the scope of the illustrative embodiments.

The illustrative embodiments recognize that relevant information is needed to keep a conversation meaningful, interesting, or productive. For example, in a conversation about a sale to a customer, it helps the seller to know about the customer's likes and dislikes. Similarly, in a conversation about a policy, it is prudent for a speaker to know about the political inclinations and sentiments of a listener.

The illustrative embodiments are described using a person (user), whose mood, feelings, interests, preferences, likes, dislikes, emotional leanings, etc. (collectively hereinafter "sentiment") are useable in this manner. Within the scope of the illustrative embodiments, a sentiment includes not only an identification of the mood, feelings, interests, preferences, likes, dislikes, emotional leanings etc., but also a measurement of the mood, feelings, interests, preferences, likes, dislikes, emotional leanings, etc. on an appropriate scale, and therefore comprises a quantifiable value. For example, a sentiment of liking can be measured on a scale of 0-10, 0 representing a strong dislike, 10 representing a strong liking, and other values on the scale representing intermediate degrees of liking.

A system that participates in a conversation can similarly have preferential configurations. When a sentiment applies to a system, the sentiment refers to a preference setting of the system. Within the scope of the illustrative embodiments, a sentiment of a system includes not only an identification of a preference, but also a measurement of the preference setting on an appropriate scale, and therefore comprises a quantifiable value. For example, a preference setting can be measured on a scale of 0-10, 0 representing a strong aversion (opposite of a preference), 10 representing a strong preference, and other values on the scale representing intermediate degrees of preference. Thus, unless expressly distinguished where used, a sentiment can apply to a human participant as well as a system participant in a conversation.

The illustrative embodiments further recognize that a sentiment is not fixed or static. In other words, sentiments towards things, entities, and events have a temporal and relative nature, and a variety of factors affect a sentiment at a given time and under a given set of circumstances. For example, a user may normally prefer or have a preference type sentiment for hiking vacations, but with age—a temporal factor, or when afflicted with an ailment—a circumstance factor, the same user may prefer that booking a relaxing beach vacation when talking with a travel agent.

Presently, the knowledge of a user's sentiments is limited to the user's profile, which is static. Typically, the user's profile is created at some point in time with the information available about the user at the time. In some cases, logs or notes of previous conversations with the user are also maintained together with the profile.

Presently, systems such as interactive voice response (IVR) systems or other customer interaction systems do use user profiles and records of past interactions with the user in conducting a present conversation. The illustrative embodiments recognize that the business analytics of the presently available systems are not designed to aid one participant in a conversation during a presently occurring conversation, with information that is not only relevant to the conversation but is also current about the sentiments of the other participant as relates to the topic of the conversation.

The illustrative embodiments recognize that historical information about a user often fails to relate to a topic or subject in a later conversation with the user, and often fails to adjust according to the dynamic sentiments of the user at the time of the conversation. The illustrative embodiments further recognize that presently available systems are not able to identify and collect conversation-specific information—such as user-specific data and/or topic-specific data—during a conversation. The presently available systems are unable to cognitively analyze such current information during the conversation, to relate a topic or subject in a later conversation with the user, to adjust the conversation according to the dynamic sentiments of the user at the time of the conversation, and to generally steer or guide the conversation according to the user-sentiment and the context of the conversation.

The illustrative embodiments used to describe the invention generally address and solve the above-described problems and other problems related to steering an ongoing present conversation by relating a user's sentiment with a topic, subject, or context of the ongoing conversation. The illustrative embodiments provide a method, system, and computer program product for guiding a conversation based on cognitive analytics.

At a given time, an embodiment detects that a conversation is currently presently ongoing via a suitable conversation interface. Some examples of a conversation interface include but are not limited to a telephone device or application, a chat or messaging application, an audio or video conferencing tool, and the like.

The embodiment receives the data of the conversation up to the time and analyzes the data to identify a participant user and a context of the conversation. For example, one embodiment identifies a remote person or a system with whom the conversation is occurring via the conversation interface. An embodiment also identifies, as the context of the conversation, a topic or a subject being discussed in the present conversation, a domain or subject matter to which the present conversation relates, an issue to which the conversation presently refers, and the like.

An embodiment selects one or more sources of data according to the identified user, the identified context, or both. For example, if the conversation is about helping a user select a refrigerator, the embodiment collects data from a discussion forum on home appliances in which the user may have asked a question or made an inquiry. As another example, if the conversation is about a user shopping for a European vacation, the embodiment collects data about the user from a social media site to identify the user's travel interests and preferences, European regions of the user's ancestral origins, user's dislikes and disabilities, and the like.

The embodiment submits the context of the present conversation, and the data collected from one or more data sources during the conversation to a cognitive system. A cognitive system is a combination of NLP system and a Q and A system. For example, the NLP system processes the data and prepares therefrom information consumable by a Q and A system. The Q and A system identifies those aspects of the NLP processed information that have at least a threshold degree of relevance or a threshold strength of relationship with the supplied context. Thus, the Q and A system prepares Q and A ready information against which natural language questions or machine understandable can be asked, and using which the Q and A system can provide natural language or machine understandable answers.

Once the Q and A ready information is available, an embodiment supplies as a question, during the conversation, to the Q and A system the user sentiments at the time of the conversation. The embodiment receives as an answer, those zero or more aspects of the Q and A ready information, which satisfy the question to at least a threshold degree. For example, if the embodiment asks the question—which European countries (context) might this user who likes hiking (sentiment) like to visit in June (context). Assume that the Q and A ready information is based on the user's desire to visit Scandinavia and the Mediterranean region expressed in a travel blog. Based on the time of travel, user's sentiment, political stability of the region, and other such factors relevant to the conversation, the embodiment may receive Sweden and Denmark as possible answers with higher than threshold degree of confidence and not Greece due to a lower-than-threshold degree of confidence from the cognitive system.

An embodiment constructs a conversation prompt based on an answer received from the cognitive system. A conversation prompt is a question, an answer, or a suggestion to be made during the conversation, a topic or discussion to be avoided during the conversation, and the like. For example, the embodiment supplies a travel agent, without the user's knowledge, a conversation prompt to suggest Denmark as a possible travel destination. Another example of a conversation prompt might be to avoid suggesting Greece as a possible travel destination.

One embodiment further uses the answers received from the cognitive system to enrich a profile associated with the user. For example, an initial or previous profile may already exist or may be created and associated with the user. The embodiment populates or manipulates the profile with the context of the ongoing conversation, sentiment of the user during the conversation, data from a data source, a portion of a question asked to the cognitive system, an answer from the cognitive system, a prompt presented for the conversation, or some combination thereof.

Such populating or manipulation of the profile is referred to as dynamic enrichment of the profile. The resulting profile is enriched because the resulting profile provides a better, deeper, or "richer" into the user's behavior than a prior-art static profile with or without historical logs can. The resulting profile is dynamic because the resulting profile contains information about the user according to the temporal characteristics of the user's behavior and the changes therein, which a prior-art static profile with or without historical logs cannot.

An embodiment receives response data from the conversation interface, to wit, data of the conversation occurring after the conversation prompt in the ongoing conversation. The embodiment iteratively uses the response data to further select data sources, augment or refine the collected data with additional data, supply the augmented or refined data to the cognitive system and receive more answers that relate to context and sentiment in the conversation after the conversation prompt. An embodiment also iteratively enriches the dynamically enriched profile with such information as the conversation progresses in real-time.

A method of an embodiment described herein, when implemented to execute on a device or data processing system, comprises substantial advancement of the functionality of that device or data processing system in improving an outcome of a conversation, and the insight into the sentiments of a participant in the conversation. For example, prior-art customer management systems maintain static customer profiles and historical logs of past conversations but cannot steer or affect an ongoing conversation. An embodiment detects a context of an ongoing conversation during the conversation and determines a sentiment of a participant related to that present context. An embodiment further makes suggestions during the ongoing conversation to steer the conversation, or otherwise cause the conversation to change in a desirable manner for the participant. An embodiment further dynamically enriches a profile of the participant according to the present conversation occurring in real-time. The dynamically enriched profile itself can therefor become a high value data source in the present and future conversations with the participant. Such manner of steering an ongoing conversation and dynamic enrichment of user profiles is unavailable in presently available devices or data processing systems. Thus, a substantial advancement of such devices or data processing systems by executing a method of an embodiment improves the outcome of conversations while changing a sentiment, response, discussion, topic, subject, context, or outcome of a currently progressing conversation—to wit, steer the conversation—using cognitive analytics.

The illustrative embodiments are described with respect to certain conversations and conversation types, conversation interfaces, participants and users, contexts, topics, subjects, sentiments, preferences, data, Q and A ready information, cognitive system and its components, profiles and profile components, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
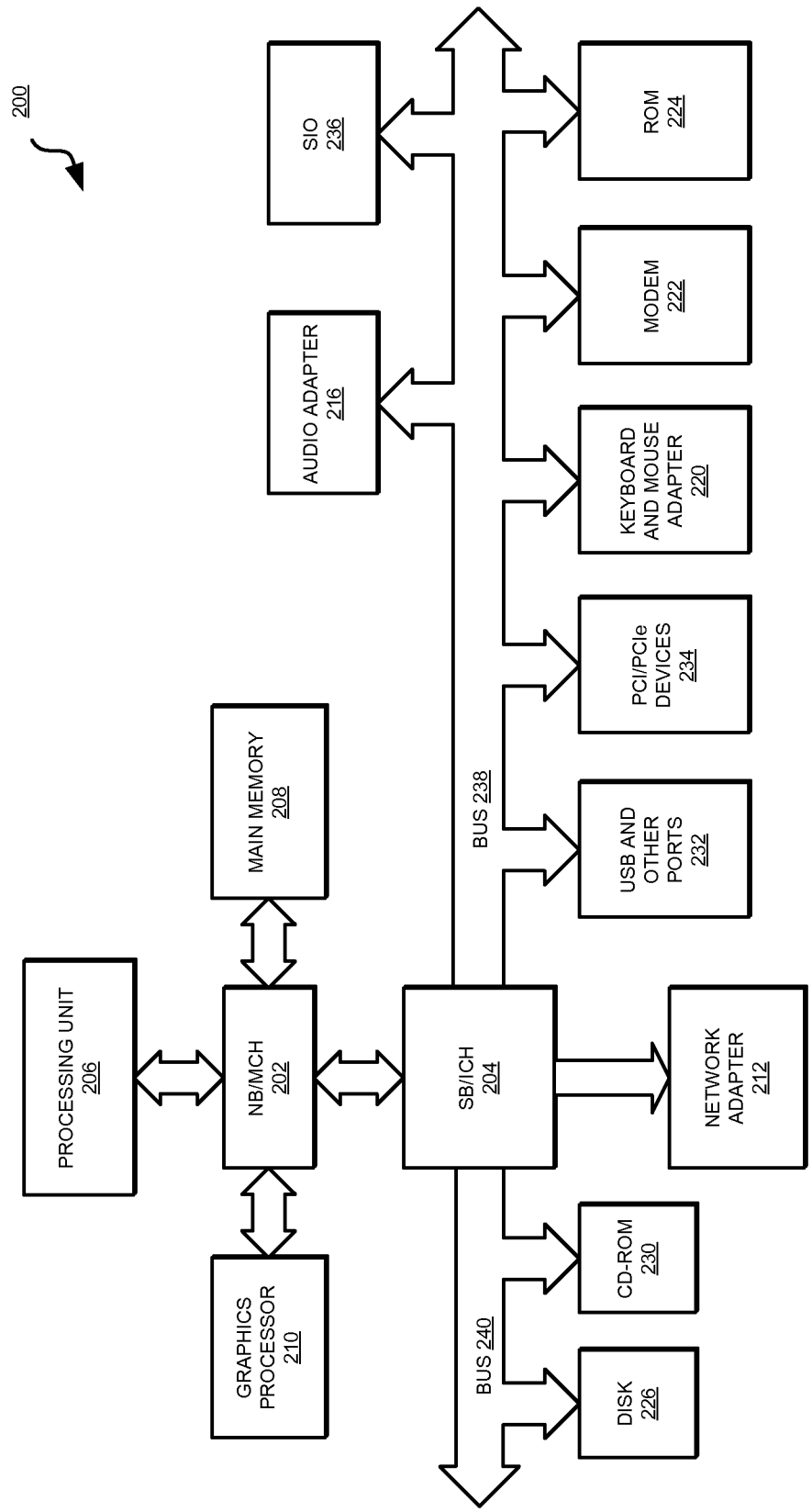
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

An embodiment described herein can be implemented in any data processing system, such as in the form of application 105 in server 104. Application 105 operates in conjunction with conversation interface 103 and cognitive system 107 as described herein. Data source 113, data source 115, and any number of similar data sources can be selected provide the data relevant to the context and identity of the participant of an ongoing conversation. Profile 109 is a profile associated with a participant of a conversation occurring using conversation interface 103. Profile 109 can be dynamically enriched in a manner described herein, and can also serve as a data source similar to data source 113 or 115.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
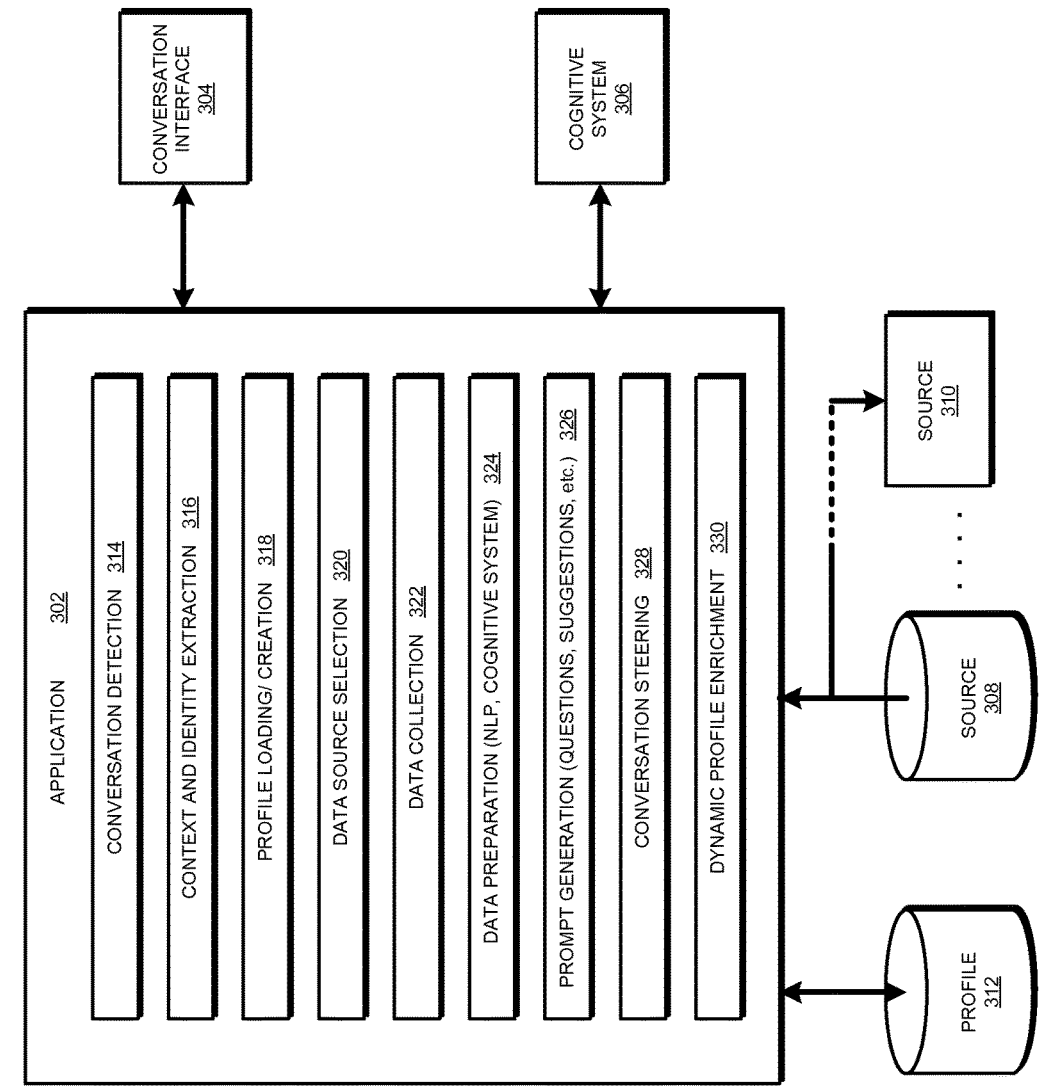
FIG. 3 depicts a block diagram of a configuration for guiding a conversation based on cognitive analytics in accordance with an illustrative embodiment.

With reference to FIG. 3, this figure depicts a block diagram of a configuration for guiding a conversation based on cognitive analytics in accordance with an illustrative embodiment. Application 302 is an example of application 105 in FIG. 1. Conversation interface 304 is an example of conversation interface 103 in FIG. 1. Cognitive system 306 is an example of cognitive system 107 in FIG. 1. Data sources 308-310 can be any number or type of data sources in the manner of data source 113 or 115. Profile repository 312 is an example of profile repository 108 and includes one or more profiles in the manner of profile 109 FIG. 1.

Component 314 of application 302 detects a conversation beginning or occurring at a given time (an ongoing conversation) using conversation interface 304. Component 314 receives from conversation interface 304 the data of the ongoing conversation.

Component 316 extracts one or more pieces of contextual information about the conversation from the received data of the ongoing conversation. Component 316 also extracts from the data of the ongoing conversation one or more pieces of information to identify a remote user who is participating in the conversation. Such identifying information may be provided in the data of the ongoing conversation by the remote user, by an entity using the system where conversation interface 304 is executing, or a combination thereof.

Component 318 loads an existing profile of the remote user or creates a new profile for the remote user if one does not exist. The existing profile can be a prior-art static profile, which can be dynamically enriched as described herein. The exiting profile can be a previously enriched profile. The new profile is dynamically enriched after creation in a manner described herein.

Component 320 selects one or more data sources that can provide data relevant to or related to a context, an identifying information of the remote user, or a combination thereof.

Component 322 collects or receives from the selected data source(s), the data related to the context, the identifying information of the remote user, or the combination thereof.

A data source can be a database, a web server, a source associated with a social media, and generally any data repository accessible over a data network. Social media comprises any medium, network, channel, or technology for facilitating communication between a large number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional messages, or bi-directional or broadcast communications in a variety of languages and forms. Such communications in the social media data can include proprietary conversational styles, slangs or acronyms, urban phrases in a given context, formalized writing or publication, and other structured or unstructured data.

Component 324 prepares the collected data for use by cognitive system 306. For example, component 324 may be configured to perform pre-processing, normalization, encoding, filtering, and other similar operations on the collected data.

Component 326 generates the conversation prompts. For example, once component 324 prepares and provides the collected data to cognitive system 306, component 326 presents to cognitive system 306 a question related to the sentiment of the remote user. For example, the question can be a request to determine the remote user's sentiment on a topic of the ongoing conversation. As another example, the question can be a request to make an answer choice that is favorable to the remote user's sentiment on a topic of the ongoing conversation. As another example, the question can be a request for an answer choice that should be avoided according to the remote user's sentiment on a topic of the ongoing conversation.

These examples of questions are not intended to be limiting. From this disclosure, those of ordinary skill in the art will be able to conceive many other questions that can be presented to cognitive system 306 for a similar purpose and the same are contemplated within the scope of the illustrative embodiments.

Component 326 receives from cognitive system 306 an answer for a question presented to cognitive system 306. Component 326 composes the answer in a structure and type suitable for the conversation. For example, if the conversation is an audio conversation occurring in the French language, component 326 constructs the prompt as an audio playback in French. As another example, if the conversation is a chat conversation occurring in the English language, component 326 constructs the prompt as English text.

Component 328 introduces the generated prompt into the ongoing conversation, during the conversion. Component 328 introduces the prompt to steer the conversation. Particularly, component 328 introduces the prompt into the conversation such that the entity using the system on which conversation interface 304 executes receives the contents of the prompt but the remote user remains unaware of the prompt.

For example, the audio prompt may be played only to the entity and not to the remote user. As another example, the textual prompt may be presented only on the entity's display and not on the remote user's display. Furthermore, component 328 presents to the prompt to the entity in a manner that allows the entity to decide whether to act on the prompt during the conversation, when to act on the prompt during the conversation, avoid the prompt during the conversation, allow an action to occur on conversation interface 304 in response to the prompt, or some combination thereof.

Component 330 dynamically enriches the profile loaded or created by component 318. As the conversation progresses in real-time, components 316, 320, 322, 324, 326, 328, and 330 perform their respective functions iteratively to keep the conversation desirable according to the remote user's dynamic sentiments.

The data collected from a data source can be a source of the sentiment information. The conversation data itself can be a source of the sentiment information. Cognitive system 306 can also perform sentiment analysis to extract, detect, infer, or extrapolate the remote user's sentiment on a topic or context.

Figure 4:
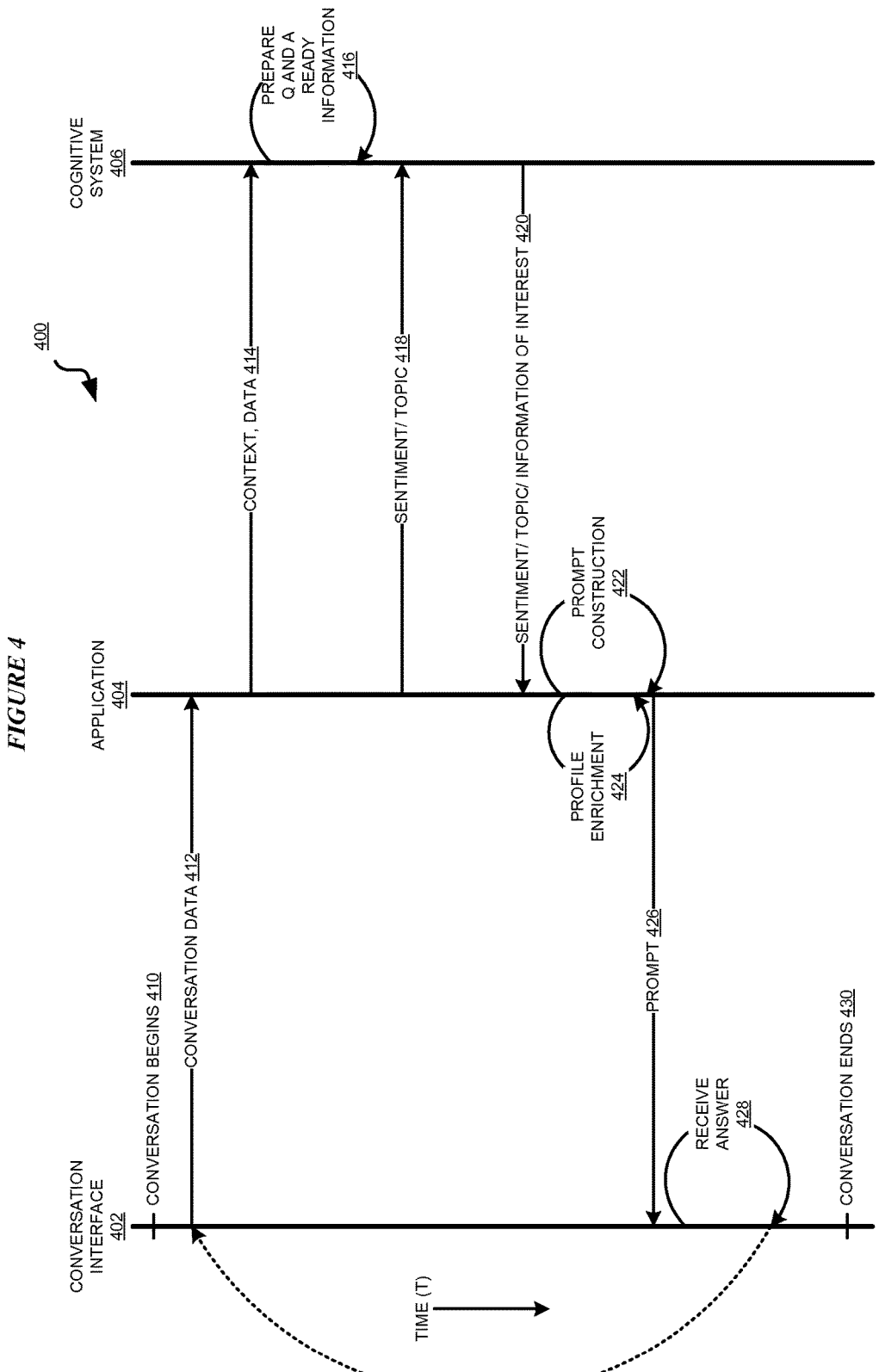
FIG. 4 depicts a timing diagram of an example series of interactions for guiding a conversation based on cognitive analytics in accordance with an illustrative embodiment.

With reference to FIG. 4, this figure depicts a timing diagram of an example series of interactions for guiding a conversation based on cognitive analytics in accordance with an illustrative embodiment. Timing diagram 400 illustrates example interactions and data exchanges between conversation interface 402, application 404, and cognitive system 406, occurring and progressing along time T. Conversation interface 402 is an example of conversation interface 304 in FIG. 3. Application 404 is an example of application 302 in FIG. 3. Cognitive system 406 is an example of cognitive system 306 in FIG. 3.

Conversation begins (410) at conversation interface 402. Application 404 receives conversation data (412). Application 404 extracts a context from the conversation data, collects context-related data from one or more data sources, and provides the context and the collected data (414) to cognitive system 406.

Cognitive system 406 prepares the Q and A ready information (416). Application 404 sends a question in the form of a request to cognitive system 406, where the question is based on a sentiment of a remote user participating in the conversation, contextual information such as a topic, or some combination thereof (418). Application 404 receives from cognitive system 406 a response containing an answer to the question. The answer can include a sentiment of the remote user extracted or derived from the Q and A ready information, a topic or context-related information extracted or derived from the Q and A ready information, other information of interest to the remote user extracted or derived from the Q and A ready information, or some combination thereof (420).

Application 404 constructs a conversation prompt (422). Application 404 also performs dynamic enrichment of the profile of the remote user (424).

Application 404 sends the conversation prompt (426) to conversation interface 402. Conversation interface 402 receives an answer, such as data of a continuing conversation steered by the prompt, (428).

This cycle repeats as long as the conversation continues. The conversation ends at some point in time (430).

Figure 5:
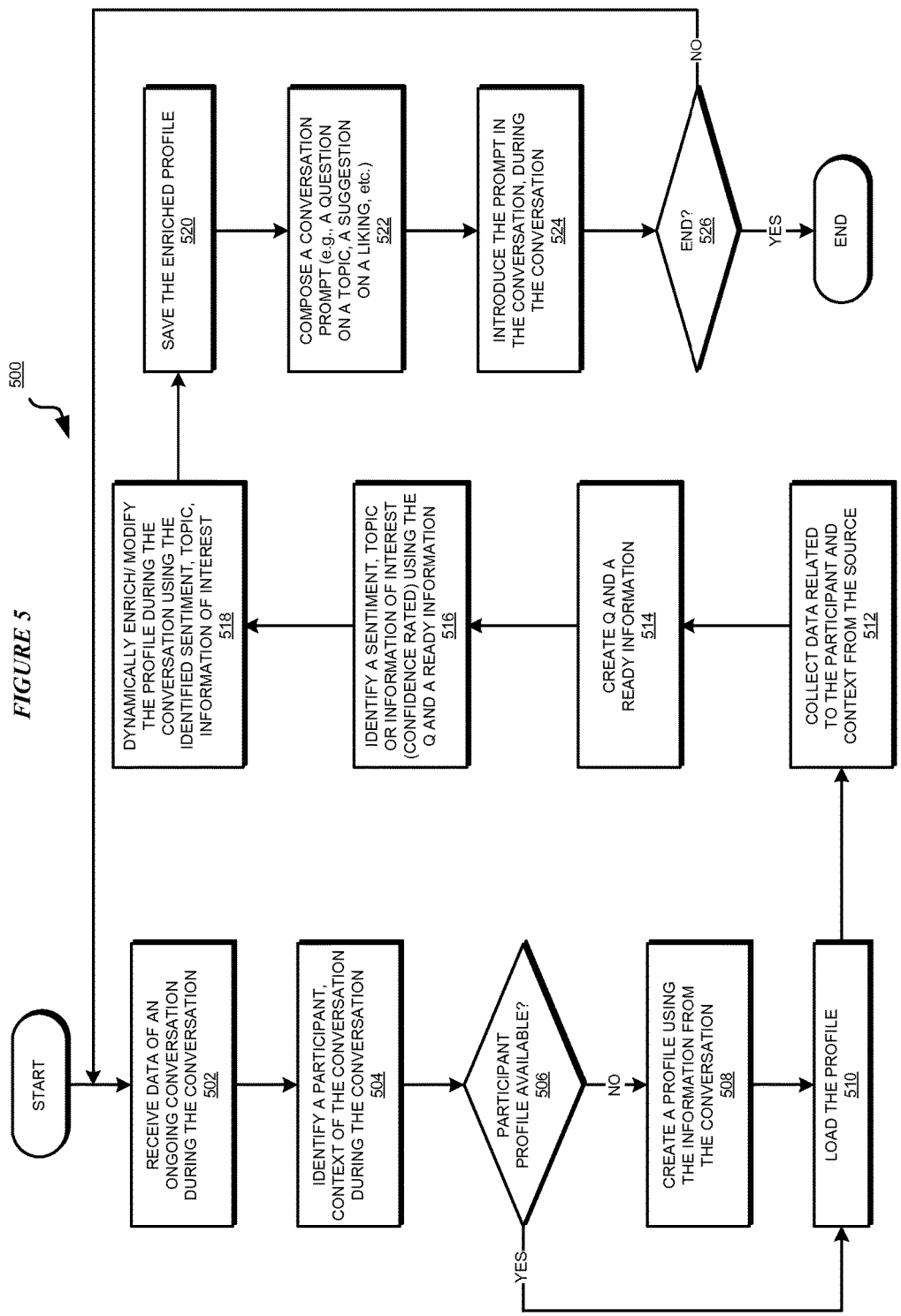
FIG. 5 depicts a flowchart of an example process for guiding a conversation based on cognitive analytics in accordance with an illustrative embodiment.

With reference to FIG. 5, this figure depicts a flowchart of an example process for guiding a conversation based on cognitive analytics in accordance with an illustrative embodiment. Process 500 can be implemented in application 404 in FIG. 4.

The application receives the data of an ongoing conversation, during the conversation (block 502). The application identifies a participant in the conversation—the remote user—and a context of the conversation (block 504).

The application determines whether a participant profile is available (block 506). If a participant profile is not available ("No" path of block 506), the application creates a profile for the participant based on the data of the conversation (block 508). The application loads the profile (block 510). If a participant profile is available ("Yes" path of block 506), the application loads the profile (block 510).

The application collects data related to the participant and the context from a data source (block 512). The application creates or causes to be created a Q and A ready information, such as in a cognitive system (block 514). Using a question and answer method with the cognitive system, and based on the Q and A ready information, the application identifies participant-specific current information related to the context of the conversation, a sentiment of the participant towards the conversation, a sentiment of the participant towards the context of the conversation, information of interest to the participant based on the sentiment and the context, confidence values assigned by the cognitive system to the sentiment and information of interest, or some combination thereof (block 516).

Using the answers, the application dynamically enriches or modifies the profile of the participant (block 518). The application saves the enriched profile (block 520).

The application also composes a conversation prompt based on the answers (block 522). While the conversation is ongoing, the application introduces the prompt in the conversation (block 524).

The application determines whether to end process 500 (block 526). If process 500 is not to be ended ("No" path of block 526), the application proceeds to block 502 to receive new conversation data after the prompt is introduced in the conversation. If process 500 is to be ended ("Yes" path of block 526), the application ends process 500 thereafter.

Thus, a computer implemented method, system or apparatus, and computer program product are provided in the illustrative embodiments for guiding a conversation based on cognitive analytics. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for guiding a conversation based on cognitive analytics, the method comprising:
   receiving, from a conversation interface, while the conversation is continuing, data of the conversation up to a time in the conversation;
   receiving while the conversation is continuing, current data from a data source, the current data relating to a remote participant in the conversation and a topic in the conversation;
   computing, as a part of the cognitive analytics, using a processor and a memory, from the current data and the conversation data, a measurement of a sentiment value of the remote participant during the conversation;
   introducing, while the conversation is continuing, data of a prompt into the conversation, wherein the data of the prompt is configured to cause the conversation to increase the sentiment value of the remote participant; and
   updating a profile of the remote participant with the sentiment value, to form an updated profile; and
   using the updated profile as a second data source in a later portion of the conversation.

2. The method of claim 1, further comprising:
   processing the current data and the conversation data to create cognitive information; and
   configuring the data of the prompt using information associated with the sentiment value and extracted from the cognitive information.

3. The method of claim 1, further comprising:
   making, as a part of the introducing, the data of the prompt accessible to a second participant in the conversation but inaccessible to the remote participant in the conversation.

4. The method of claim 1, further comprising:
   constructing the prompt in a natural language, wherein the conversation is occurring in the natural language.

5. The method of claim 1, further comprising:
   processing the current data and the conversation data to create cognitive information; and
   requesting, as a part of the determining, an answer to a question, wherein the answer comprises an inference from the cognitive information.

6. The method of claim 5, wherein the question is a natural language question and the answer is a natural language answer.

7. The method of claim 1, wherein the sentiment value represents a dislike of the remote participant towards an aspect of the conversation.

8. The method of claim 7, further comprising:
   processing the current data and the conversation data to create cognitive information, wherein the aspect of the conversation is derived from the cognitive information.

9. The method of claim 1, further comprising:
   processing the current data and the conversation data to create cognitive information; and
   selecting an information of interest from the cognitive information, wherein the information of interest corresponds to the sentiment value.

10. The method of claim 1, wherein the sentiment value is valid during the conversation, and wherein the sentiment value is a different value before the conversation.

11. The method of claim 1, further comprising: further updating the profile with the data of the prompt.

12. The method of claim 1, further comprising:
    pre-processing the current data, wherein the pre-processing comprises filtering the current data to extract a portion of the current data, wherein the portion of the current data comprises a data interaction of the remote participant with the data source.

13. The method of claim 1, further comprising:
    performing, as a part of the processing, Natural Language Processing (NLP) on the conversation data.

14. The method of claim 1, further comprising:
    identifying a remote participant in the conversation; and
    identifying a topic in the conversation.

15. The method of claim 1, wherein the data source comprises a social media source, and wherein the current data comprises a data interaction of the remote participant with the social media source.

16. The method of claim 1, further comprising:
    detecting that the conversation has started in the conversation interface, and wherein the data of the conversation is from a time of a beginning of the conversation up to the time in the conversation.

17. The method of claim 1, wherein the method is embodied in a computer program product comprising one or more computer-readable storage devices and computer-readable program instructions which are stored on the one or more computer-readable tangible storage devices and executed by one or more processors.

18. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

19. A computer program product for guiding a conversation based on cognitive analytics, the computer program product comprising one or more computer-readable storage devices, and program instructions stored on at least one of the one or more storage devices, the stored program instructions comprising:

program instructions to receive, from a conversation interface, while the conversation is continuing, data of the conversation up to a time in the conversation;

program instructions to receive while the conversation is continuing, current data from a data source, the current data relating to a remote participant in the conversation and a topic in the conversation;

program instructions to compute as a part of the cognitive analytics, using a processor and a memory, from the current data and the conversation data, a measurement of a sentiment value of the remote participant during the conversation;

program instructions to introduce, while the conversation is continuing, data of a prompt into the conversation, wherein the data of the prompt is configured to cause the conversation to increase the sentiment value of the remote participant; and program instructions to a profile of the remote participant with the sentiment value, to form an updated profile; and program instructions to use the updated profile as a second data source in a later portion of the conversation.

20. A computer system for guiding a conversation based on cognitive analytics, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive, from a conversation interface, while the conversation is continuing, data of the conversation up to a time in the conversation;

program instructions to receive while the conversation is continuing, current data from a data source, the current data relating to a remote participant in the conversation and a topic in the conversation;

program instructions to compute as a part of the cognitive analytics, using a processor and a memory, from the current data and the conversation data, a measurement of a sentiment value of the remote participant during the conversation;

program instructions to introduce, while the conversation is continuing, data of a prompt into the conversation, wherein the data of the prompt is configured to cause the conversation to increase the sentiment value of the remote participant; and program instructions to update a profile of the remote participant with the sentiment value, to form an updated profile; and program instructions to use the updated profile as a second data source in a later portion of the conversation.

\* \* \* \* \*